No. 893,200. PATENTED JULY 14, 1908.
T. P. SCULLY.
COVER OPENING DEVICE.
APPLICATION FILED MAY 23, 1907.

WITNESSES

INVENTOR
Thomas P. Scully
BY
ATTORNEYS

UNITED STATES PATENT OFFICE.

THOMAS P. SCULLY, OF ROME, NEW YORK.

COVER-OPENING DEVICE.

No. 893,200.  Specification of Letters Patent.  Patented July 14, 1908.

Application filed May 23, 1907. Serial No. 375,261.

*To all whom it may concern:*

Be it known that I, THOMAS PETER SCULLY, a citizen of the United States, and a resident of Rome, in the county of Oneida and State of New York, have invented a new and Improved Cover-Opening Device, of which the following is a full and clear description.

The invention relates to devices for automatically removing and closing the covers or the like from cans, pails, barrels and kettles and other receptacles and vessels, and its object is to provide a new and improved cover-opening device which is simple and durable in construction, and arranged to automatically swing the cover into an open position on swinging the bail from a vertical carrying position downward, and to return the cover to a closed position on bringing the bail upward into a carrying position.

The invention consists of novel features and parts and combinations of the same, parts of which will be more fully described hereinafter and then pointed out in the claims.

A practical embodiment of the invention is represented in the accompanying drawings forming a part of this specification, in which similar characters of reference indicate corresponding parts in all the views.

In order that the principle of the invention may be more clearly apparent I have illustrated a single type or embodiment of the invention in the accompanying drawing, but it is understood that I am not to be limited thereto save as expressly so stated in the claims.

Figure 1:
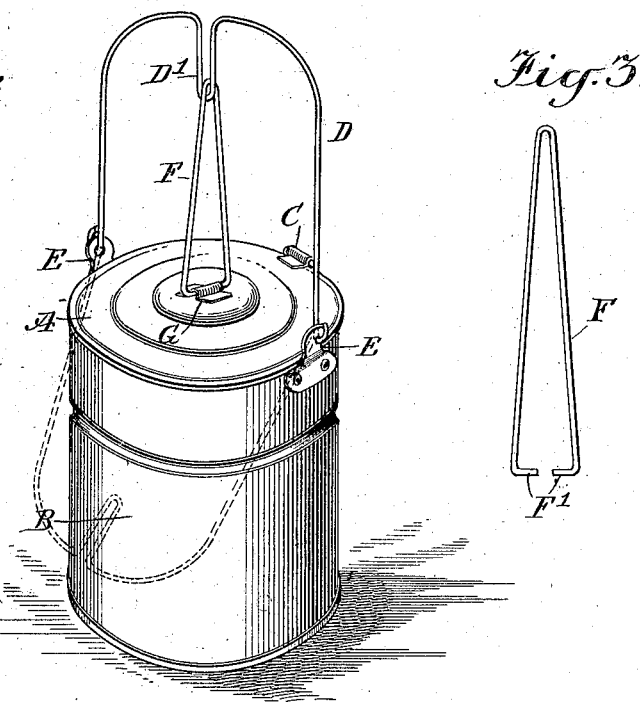
Figure 3:
Figure 2:
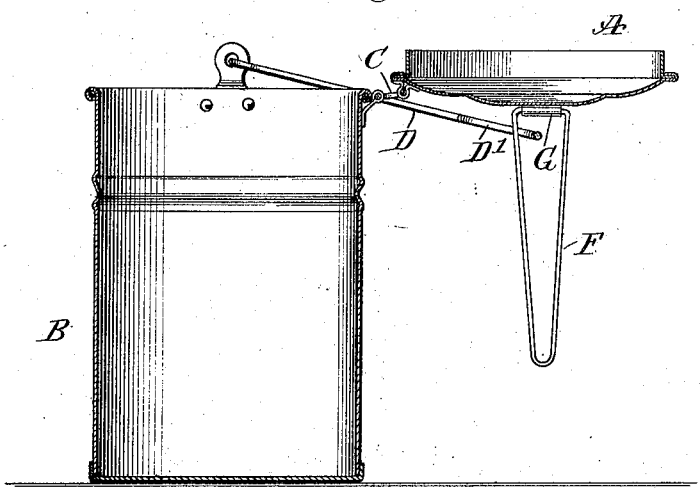

Figure 1 is a perspective view of the improvement as applied to a can and showing the cover in a closed position; Fig. 2 is a sectional side elevation of the same and showing the cover in an open position, and Fig. 3 is a side elevation of a cover arm.

The cover A, for the receptacle or vessel B, is connected by a hinge C, with the rear upper end of the receptacle or vessel B, to permit of swinging the cover A into an open or a closed position. The bail D for carrying the receptacle or vessel B about, has its side members pivotally connected with the usual lugs E, attached to the sides of the receptacle or vessel B, and the middle member of the bail D is provided with a downwardly bent portion D', passing through a triangular V-shaped arm F, having its base engaging a bearing G, attached to the cover A, so that the base of the arm F forms a pivot for the same, the base standing at right angles to the pintle of the hinge C, and when the bail D is in a vertical position and the cover A is closed, as illustrated in Fig. 1, and it is desired to open the cover A automatically, it is only necessary for the operator to swing the bail D rearwardly and downwardly, so that the bent portion D' presses on the rear leg of the triangular arm F, thus swinging the cover A into a completely open position, as illustrated in Fig. 2. When it is desired to close the cover A, the operator swings the bail D upwardly and forwardly so that the bent portion D' engages the forward leg of the triangular arm F, thus swinging the cover A into a closed position at the time the bail D reaches its vertical carrying position shown in Fig. 1.

By having the arm F pivoted on the top of the cover A, a connection is had with the bail D, so as to prevent undue binding of the connected parts when swinging the cover A automatically into an open or a closed position, on the operator manipulating the bail D correspondingly.

The bent portion D' of the bail forms a guideway for the arm F, to hold the same in proper relation to the bail D when swinging the cover A into an open or closed position, as above described, but is not an essential part of the device.

The arm F has its pivot formed by two members F' extending towards each other from the terminals of the legs of the arm F, to allow of readily placing the arm F in position in the bearing G and to permit of conveniently removing the arm F from the bearing G, and from the bent portion D' of the bail D, to permit of swinging the latter down against one side of the can B whenever it is desired to pack the can in a small space (see dotted lines in Fig. 1), for shipping purposes. The detached arm F may then be stored inside of the can or tied to the same.

The device is very simple and durable in construction, and can be readily applied to any receptacles vessels or containers, and the device can be cheaply manufactured.

Having thus described my invention, I claim as new and desire to secure by Letters Patent:

1. A device for opening hinged covers on receptacles and vessels, comprising a bail having a bent portion at its middle member, and an arm in the form of a triangular loop engaging the said bent portion and having its base pivoted on the middle of the cover, the axis of the said base being at right angles to the axis of the cover hinge.

2. In combination with a receptacle, a bail fulcrumed at the sides of the receptacle and having a bent portion at its middle member, a cover hinged at the rear of the receptacle, and an arm in the form of a triangular loop loosely engaging the said bent portion, the base of the arm being pivoted on the middle of the said cover, and the said base of the arm extending at a right angle to the pintle of the hinge connecting the cover with the receptacle.

3. A device for opening hinged covers on receptacles vessels and the like, comprising a bail hinged to the sides of the receptacle, and an arm attached to the cover and having a sliding connection with the middle member of the said bail.

4. In combination with a receptacle, a cover hinged to the upper end of the receptacle, a bail hinged to the receptacle at the sides thereof and having a downwardly bent portion in its middle member, and an arm attached to the cover and having a sliding engagement with the bent portion of the middle member of the said bail.

5. A device for opening hinged covers on receptacles and vessels, comprising a bail having a bent portion in its middle member, and an arm in the form of a triangular loop engaging the said bent portion and having its base pivoted to the cover, the axis of the said base being at right angles to the axis of the cover hinge.

6. In combination with a receptacle, a bail fulcrumed at the sides of the receptacle and having a bent portion in its middle member, a cover hinged at the rear of the receptacle, and an arm in the form of a triangular loop engaging the said bent portion, the base of the arm being pivoted on the said cover, and the said base of the arm extending at a right angle to the pintle of the hinge connecting the cover with the receptacle.

In testimony whereof I have signed my name to this specification in the presence of two subscribing witnesses.

THOS. P. SCULLY.

Witnesses:
M. H. POWERS,
W. J. POWERS.